(12) United States Patent
Sasaki

(10) Patent No.: US 8,665,200 B2
(45) Date of Patent: Mar. 4, 2014

(54) DISPLAY DEVICE AND METHOD FOR DRIVING DISPLAY DEVICE

(75) Inventor: Takashi Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 129 days.

(21) Appl. No.: 13/382,675

(22) PCT Filed: Apr. 6, 2010

(86) PCT No.: PCT/JP2010/002522
§ 371 (c)(1),
(2), (4) Date: Jan. 6, 2012

(87) PCT Pub. No.: WO2011/013274
PCT Pub. Date: Feb. 3, 2011

(65) Prior Publication Data
US 2012/0113075 A1   May 10, 2012

(30) Foreign Application Priority Data

Jul. 30, 2009   (JP) .................................. 2009-178336

(51) Int. Cl.
*G09G 3/36* (2006.01)
(52) U.S. Cl.
USPC ................ 345/96; 345/89; 345/204; 345/208
(58) Field of Classification Search
USPC .................. 345/92, 94–96, 208–210, 89, 690
See application file for complete search history.

(56) References Cited

U.S. PATENT DOCUMENTS

| | | | |
|---|---|---|---|
| 5,614,922 A | 3/1997 | Kawaguchi et al. | |
| 7,791,577 B2 * | 9/2010 | Kitayama et al. | 345/94 |
| 7,948,463 B2 * | 5/2011 | Kitayama et al. | 345/96 |
| 8,310,424 B2 * | 11/2012 | Irie et al. | 345/89 |
| 2003/0112213 A1 * | 6/2003 | Noguchi et al. | 345/96 |
| 2003/0227429 A1 | 12/2003 | Shimoshikiryo | |
| 2005/0219187 A1 * | 10/2005 | Shih | 345/94 |
| 2005/0259038 A1 * | 11/2005 | Otsuka et al. | 345/60 |

(Continued)

FOREIGN PATENT DOCUMENTS

| | | |
|---|---|---|
| JP | 07-281635 A | 10/1995 |
| JP | 2000-003160 A | 1/2000 |
| JP | 2004-062146 A | 2/2004 |
| JP | 2006-171342 A | 6/2006 |
| JP | 2008-058762 A | 3/2008 |
| JP | 2008-158286 A | 7/2008 |
| WO | WO-2006070829 A1 | 7/2006 |
| WO | WO-2007037046 A1 | 4/2007 |

OTHER PUBLICATIONS

International Search Report.

*Primary Examiner* — Lun-Yi Lao
*Assistant Examiner* — Kelly B Hegarty
(74) *Attorney, Agent, or Firm* — Harness, Dickey & Pierce, P.L.C.

(57) ABSTRACT

An embodiment of the present invention provides a display device which prevents effective voltages applied to liquid crystal from differing between positive and negative polarities, even when a generation timing of a timing signal is shifted. In at least one example embodiment, a driving signal has an electric potential waveform where one frame period is made up of first period, second period, third period, and fourth period. In first frame, each of a Low level in the first period and a Low level in the third period is lower in electric potential than a Low level in the second period. In second frame, each of a High level in the first period and a High level in the third period is higher in electric potential than a High level in the second period.

16 Claims, 10 Drawing Sheets

(56) References Cited

U.S. PATENT DOCUMENTS

| | | | |
|---|---|---|---|
| 2006/0022928 A1* | 2/2006 | Kim et al. | 345/94 |
| 2006/0119546 A1* | 6/2006 | Otsuka et al. | 345/68 |
| 2006/0125755 A1* | 6/2006 | Noguchi et al. | 345/96 |
| 2008/0055300 A1 | 3/2008 | Yamazaki et al. | |
| 2008/0106657 A1* | 5/2008 | Kitayama et al. | 349/37 |
| 2008/0106660 A1* | 5/2008 | Kitayama et al. | 349/39 |
| 2009/0195487 A1* | 8/2009 | Shimoshikiryoh et al. | 345/89 |
| 2010/0201680 A1* | 8/2010 | Furukawa et al. | 345/214 |
| 2010/0220115 A1* | 9/2010 | Sakamoto et al. | 345/690 |
| 2010/0244683 A1* | 9/2010 | Matsushita et al. | 313/582 |

* cited by examiner

DISPLAY DEVICE AND METHOD FOR DRIVING DISPLAY DEVICE

TECHNICAL FIELD

The present invention relates to a display device in which a storage capacitor line is driven.

BACKGROUND ART

There has been a multi-picture-element driving liquid crystal display device which has improved viewing angle dependence of gamma characteristic. In the multi-picture-element driving method, one (1) picture element is made up of two or more of sub-picture elements, which have different luminances, so as to improve viewing angle characteristic, i.e., viewing angle dependence of gamma characteristic.

FIG. 9 illustrates a configuration example of a picture element included in such a multi-picture-element driving liquid crystal display device (e.g., refer to Patent Literature 1).

One (1) picture element P is made up of sub-picture elements sp1 and sp2. The sub-picture element sp1 includes a TFT 16a, a sub-picture element electrode 18a, and a storage capacitor 22a. The sub-picture element sp2 includes a TFT 16b, a sub-picture element electrode 18b, and a storage capacitor 22b.

The TFT 16a and the TFT 16b have (i) respective gate electrodes which are connected with a common gate bus line GL and (ii) respective source electrodes which are connected with a common source bus line SL. The storage capacitor 22a is formed between the sub-picture element electrode 18a and a storage capacitor line CsL1, and the storage capacitor 22b is formed between the sub-picture element electrode 18b and a storage capacitor line CsL2. The storage capacitor line CsL1 extends in parallel with the gate bus line GL such that the sub-picture element sp1 is provided between the storage capacitor line CsL1 and the gate bus line GL. The storage capacitor line CsL2 extends in parallel with the gate bus line GL such that the sub-picture element sp2 is provided between the storage capacitor line CsL2 and the gate bus line GL.

The storage capacitor line CsL1 of each picture element P also serves as a storage capacitor line CsL2, which forms a storage capacitor 22b with a sub-picture element sp2 of another picture element P, which is disposed adjacent to the picture element P such that the storage capacitor line CsL1 is provided between the another picture element P and the picture element P. The storage capacitor line CsL2 of each picture element P also serves as a storage capacitor line CsL1, which forms a storage capacitor 22a with a sub-picture element sp1 of another picture element P, which is disposed adjacent to the picture element P such that the storage capacitor line CsL2 is provided between the another picture element P and the picture element P.

The following describes, with reference to FIGS. 10 and 11, a method for driving the storage capacitor lines CsL1 and CsL2 in a multi-picture-element driving display panel.

Storage capacitor lines CsL (note that "CsL1" and "CsL2" are collectively called "CsL" when "CsL1" and "CsL2" are not distinguished from each other), which are provided in an active area AA (i.e., display area), are connected with respective CS trunk lines bb which are provided in an area adjacent to the active area AA (see FIG. 10). The CS trunk lines bb constitute a CS trunk line group BB. The CS trunk line group BB may be provided only in an area which is disposed adjacent to one of sides of the active area AA in a direction in which the storage capacitor line CsL extends. That is, only one (1) CS trunk line group BB may be provided only on one side of the active area AA. Alternatively, the CS trunk line groups BB may be provided in areas which are adjacent to both sides of the active area AA in the direction in which the storage capacitor line CsL extends. That is, two CS trunk line groups BB may be provided on both sides of the active area AA.

In the case where the CS trunk line group BB is provided only on one side of the active area AA, one end of each of the storage capacitor lines CsL is connected with one of the CS trunk lines bb. In the case where the two CS trunk line groups BB are provided on both sides of the active area AA, one end of each of the storage capacitor lines CsL is connected with one of the CS trunk lines bb of one of the two CS trunk line groups BB, and the other end of the storage capacitor line CsL is connected with one of the CS trunk lines bb of the other of the two CS trunk line groups BB. The CS trunk lines bb extend in a direction perpendicular to the direction in which the storage capacitor lines CsL1 and CsL2 extend. That is, the CS trunk lines bb extend in a direction in which the source bus line SL extends.

FIG. 10 illustrates an example configuration in which two CS trunk line groups BB, each of which is made up of twelve CS trunk lines bb, are provided on both sides of the active area AA. Each of the storage capacitor lines CsL is connected to one of the twelve CS trunk lines bb of each of the two CS trunk line groups BB. The twelve (equal to the number n (n is an even number) of the CS trunk lines bb constituting the CS trunk line group BB) storage capacitor lines CsL, which are sequentially arranged, are connected with the respective twelve CS trunk lines bb of each of the two CS trunk line groups BB. This connection relation of the twelve (i.e., the number n) storage capacitor lines appears repeatedly.

In a case where the CS trunk line group BB is provided only on one side of the active area AA, the n storage capacitor lines CsL, which are sequentially arranged, are connected with the respective n CS trunk lines bb of the CS trunk line group BB. This connection relation of the n storage capacitor lines appears repeatedly.

In each of the case where the CS trunk line group BB is provided only on one side and the case where the two CS trunk line groups BB are provided on both sides, different driving signals, i.e., different storage capacitor voltages are applied to the sequential n storage capacitor lines CsL (see FIG. 11). In each odd-numbered picture element row, two storage capacitor voltages Vcs (e.g., storage capacitor voltages Vcs1 and Vcs2, . . . shown in FIG. 11), which are to be applied to the respective storage capacitor lines CsL1 and CsL2 corresponding to sub-picture elements sp1 and sp2 of a picture element P, have respective binary waveforms in which respective levels change at the same timing and which oscillate in the same cycle. The storage capacitor voltages Vcs are set so that two phases of each of pairs (i.e., n/2 pairs, where n=the number of phases) of the storage capacitor voltages Vcs are gradually shifted at every odd-numbered picture element row. Each of gate pulses Vg (Vg1, Vg3, . . . shown in FIG. 11), which are to be applied to the odd-numbered picture element rows, has a pulse period which (i) appears in a period at which corresponding two storage capacitor voltages Vcs are constant and (ii) ends in sync with a rising edge timing or a falling edge timing of the corresponding two storage capacitor voltages Vcs.

A polarity of the storage capacitor voltage Vcs and a polarity of a data signal, which is to be written into each picture element P, are reversed for each frame. Further, in each one (1) frame, the polarity of the storage capacitor voltages Vcs and the polarity of the data signal are reversed every sequential plurality of horizontal periods.

According to the configuration, first, a data signal is written in a picture element P in a selected one of the odd-numbered picture element rows, and accordingly storage capacitor voltages Vcs applied to the picture element P change. As a result of this, different electric potential variations ΔV, to which a feed-through phenomenon due to capacitors between the gate bus line GL and the sub-picture elements sp1 and sp2 of the picture element P are added, are added to respective picture element electrode potentials of the sub-picture elements sp1 and sp2 into which the identical data signal has been written. This causes the sub-picture elements sp1 and sp2 to have different luminances. From this, an average luminance, which is caused by an effective voltage applied to liquid crystal based on the storage capacitor voltage Vcs in one (1) frame period, causes the entire picture element P to have appropriate gamma characteristic in a wide viewing angle range.

After the odd-numbered picture element rows are scanned, even-numbered picture element rows are scanned similarly. In this case, storage capacitor voltages Vcs in each of the even-numbered picture element rows, which storage capacitor voltages Vcs are applied to respective sub-picture elements sp1 and sp2 of a picture element P, do not have levels which change at the same timing, unlike the storage capacitor voltages Vcs applied to each of the odd-numbered picture element rows. However, after the gate pulse period is ended, the first electric potential change of the picture element electrode is similar to that in the odd-numbered picture element row. Therefore, the gamma characteristic is improved also in the even-numbered picture element rows.

The waveforms of the respective storage capacitor voltages Vcs and the method for scanning are merely examples. The main technical content is to improve the gamma characteristic in the entire picture element P by causing the sub-picture elements sp1 and sp2 to have different luminances by utilizing changes in different storage capacitor voltages Vcs.

Such storage capacitor voltages Vcs are supplied via the respective CS trunk lines bb. Accordingly, storage capacitor voltages Vcs are to be applied to the respective CS trunk lines bb in each of the two CS trunk line groups BB. Accordingly, the storage capacitor voltages Vcs are supplied, from a CS driver (not illustrated), to the respective CS trunk lines bb in the CS trunk line group BB (i.e., the number of phases of the respective storage capacitor voltages Vcs is identical to that of the CS trunk lines bb in the CS trunk line group BB). FIG. 11 illustrates an example in which 12-phase storage capacitor voltages Vcs are supplied. In the case where the two CS trunk line groups BB are provided on both sides of the active area AA (see FIG. 10), an identical storage capacitor voltage Vcs is applied to two CS trunk lines bb, which are connected with an identical storage capacitor line CsL, of the respective two CS trunk line groups BB. According to the configuration, the storage capacitor voltages Vcs are applied from both sides of the active area AA. This makes it possible to suppress a difference in waveform of the storage capacitor voltage Vcs between different parts in the active area AA, which difference is caused due to wiring delay in a large sized liquid crystal screen.

CITATION LIST

Patent Literature

[Patent Literature 1]
Japanese Patent Application Publication Tokukai No. 2004-62146 A (Publication date: Feb. 26, 2004)
[Patent Literature 2]
International Publication No. WO2006/070829 (Publication date: Jul. 6, 2006)
[Patent Literature 3]
Japanese Patent Application Publication Tokukai No. 2000-3160 A (Publication date: Jan. 7, 2000)
[Patent Literature 4]
Japanese Patent Application Publication Tokukaihei No. 7-281635 A (Publication date: Oct. 27, 1995)

SUMMARY OF INVENTION

Technical Problem

According to the conventional multi-picture-element driving liquid crystal display device, start timings, in each frame, of driving signals CS (CS1 through CS10), which are storage capacitor voltages applied to the respective CS trunk lines bb, are determined based on a timing of a gate start pulse GSP which has a cycle of one (1) vertical period (1V) (see FIG. 12). A storage capacity supply circuit supplies the driving signals CS. Each two of the driving signals CS (i.e., CS1 and CS2, CS3 and CS4, CS5 and CS6, CS7 and CS8, and CS9 and CS10) have reversed polarities in each phase. When the gate start pulse GSP is supplied to the storage capacity supply circuit so as to notify a start timing of one (1) frame, the storage capacity supply circuit changes polarities of the respective driving signals CS from those in a followed frame to the others. The timing of the gate start pulse GSP may be a rising edge timing of the gate start pulse GSP or a falling edge timing of the gate start pulse GSP. FIG. 12 illustrates, as an example, a case where 10-phase driving signals CS are used. Note however that, even in a case where the number of phases is different from that illustrated in FIG. 12, start timings of the respective driving signals CS are determined based on the gate start pulse GSP.

In FIG. 12, High and Low of each of the driving signals CS are switched every 10 horizontal periods (10H). The each pair of the driving signals CS, which are configured by respective pulse signals having reversed polarities, is set to have a phase which is delayed by 2 horizontal periods (2H) from a followed pair of the driving signals CS.

When the gate start pulse GSP is generated at the change of frames, storage capacitor voltages for the following frame starts to be supplied, as the respective driving signals CS, in sync with generation of the gate start pulse GSP (see FIG. 13). When the switching of the storage capacitor voltages is carried out at a normal timing, each of the lastly-started positive polarity level and the lastly-started negative polarity level of the driving signal CS in each frame has a predetermined length of, for example, 14 horizontal periods (14H) and each of the other positive polarity levels and the other negative polarity levels in the frame has a predetermined length of, for example, 10 horizontal periods (10H). The lastly-started polarity level (e.g., the negative polarity level in FIG. 13) in each frame has, as the predetermined length of period, (i) a length of period t1 which starts at a start timing of the lastly-started polarity level and ends at a generation timing of a gate start pulse GSP and (ii) a length of period t2 which starts at the generation timing of the gate start pulse GSP and ends at an end timing of the lastly-started polarity level.

However, the conventional display device has a problem that the generation timing of the gate start pulse GSP is unexpectedly shifted, and thereby the waveform of the driving signal CS is distorted at the change of frames (see FIG. 14). In FIG. 14, a gate start pulse which is generated at a normal timing is indicated by "GSP1" and a gate start pulse which is generated at an unexpectedly shifted timing is indicated by "GSP2". For example, it is assumed that the gate start pulse GSP2 is generated at a timing earlier than that of the gate start pulse GSP1.

In such a case, since the storage capacitor voltage of the following frame starts to be supplied at the generation timing of the gate start pulse GSP, (i) a period, which starts at the generation timing of the gate start pulse GSP and ends at the end timing of the lastly-started polarity level in the followed frame, is identical to the period t2 of the case where the generation timing of the gate start pulse GSP is normal (hereinafter, referred to as "normal case") but (ii) a period, which starts at the start timing of the lastly-started polarity level in the followed frame and ends at the generation timing of the gate start pulse GSP, becomes a period t1', which is shorter than the period t1 in the normal case.

Therefore, a length of period xH (which is t1'+t2) of the lastly-started polarity level in the followed frame becomes shorter, as compared to the length (i.e., t1+t2) in the normal case. That is, "x" becomes smaller than 14. Consequently, the lastly-started positive polarity level in each frame is to have a length of period which is different from that of the lastly-started negative polarity level in the frame. Therefore, effective voltages applied to liquid crystal become different between the period in which the storage capacitor voltage having the positive polarity is applied and the period in which the storage capacitor voltage having the negative polarity is applied. The same applies to a case where the gate start pulse GSP is generated at a timing later than that in the normal case, contrary to the case illustrated in FIG. 14.

As described above, the conventional multi-picture-element driving liquid crystal display device has a problem that, when the generation timing of the gate start pulse is unexpectedly shifted, effective voltages applied to liquid crystal become different between the period in which the storage capacitor voltage having the positive polarity is applied and the period in which the storage capacitor voltage having the negative polarity is applied.

The present invention is accomplished in view of the problem, and an object of the present invention is to provide a display device and a method for driving the display device which can prevent the effective voltages applied to liquid crystal from differing between the positive polarity and the negative polarity, even when a generation timing of a timing signal is unexpectedly shifted.

Solution to Problem

In order to attain the object, in a display device of the present invention in which a storage capacitor line is driven with a driving signal: the driving signal, which is generated in said display device, has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods; the first period starts based on a generation timing of a timing signal which determines a start timing of the one (1) frame period, the driving signal having any one of a first High level and a first Low level during the first period, and the first High level and the first Low level being alternated every frame period; in the second period, the electric potential level alternates between a second High level and a second Low level; during the third period, (i) the driving signal has a third High level when the driving signal has the first High level during the first period of the same frame or (ii) the driving signal has a third Low level when the driving signal has the first Low level during the first period of the same frame; in the fourth period, the electric potential level alternates between a fourth High level and a fourth Low level until a generation timing of the timing signal which determines a start timing of a following one (1) frame period; any adjacent two of the frame periods belong to a first frame and a second frame, respectively; in the first frame, the driving signal has (i) the first Low level during the first period, (ii) the second High level at the beginning and the end of the second period, and (iii) the third Low level during the third period, each of the first Low level and the third Low level being lower in electric potential than the second Low level; and in the second frame, the driving signal has (i) the first High level during the first period, (ii) the second Low level at the beginning and the end of the second period, and (iii) the third High level during the third period, each of the first High level and the third High level being higher in electric potential than the second High level.

According to the configuration, the first through fourth periods have respective lengths, and the electric potential level is set in each of the first through fourth periods. Therefore, when the time length of each of the fourth High and Low levels is sufficiently shorter than a possible normal length of the fourth period, the fourth High and Low levels can be assumed to appear approximately the same number of times until the following one (1) frame period, regardless of the generation timing of the timing signal for indicating start of the following one (1) frame period.

This brings about such an effect of allowing the fourth period to be such that a difference between the number of High level periods and the number of Low level periods appearing in the fourth period is not so dependent on the generation timing of the timing signal. It is therefore possible to obtain, throughout the time period of the pair of the first and second frames (i.e., throughout the whole display period), a desired relation between the sum of the time lengths of the High levels and the sum of the time lengths of the Low levels in the driving signal, even when the generation timing of the timing signal is unexpectedly shifted.

Moreover, since (i) the electric potential of each of the first High level and the third High level is higher than that of the second High level and (ii) the electric potential of each of the first Low level and the third Low level is lower than that of the second Low level, a speed of charging the loads by the driving signal is increased in the first period and the third period. It is accordingly possible to improve the charging rate of the loads with the driving signal in the sequential third period, the fourth period, and the first period across two frames. This makes it possible to prevent unevenness in the effective voltages applied to liquid crystal which unevenness would be caused due to a decrease in the charging rate of the loads in the earliest period in one (1) frame period. With the configuration, a display can be carried out with the luminance which is uniform throughout the one (1) frame period.

This makes it possible to provide the display device which can prevent the effective voltages applied to liquid crystal from differing between the positive polarity and the negative polarity, even when the generation timing of the timing signal is unexpectedly shifted.

In order to attain the object, a method of the present invention for driving a display device, in which a storage capacitor line is driven with a driving signal, includes the step of: generating the driving signal, wherein the driving signal has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods, the first period starts based on a generation timing of a timing signal which determines a start timing of the one (1) frame period, the driving signal having any one of a first High level and a first Low level during the first period, and the first High level and the first Low level being alternated every frame period, in the second period, the electric potential level alternates between a second High level and a second Low level, during the third period, (i) the driving signal has a third High level when the driving signal has the first High level during the first period of the same frame or (ii) the driving signal has a third Low level when the driving signal has the first Low level during the first period of the same frame, in the fourth period, the electric potential level alternates between a fourth High level and a fourth Low level until a generation timing of the timing signal which determines a start timing of a following one (1) frame period, any adjacent two of the frame periods belong to a first frame and a second frame, respectively, in the first frame, the driving signal has (i) the first Low level during the first period, (ii) the second High level at the beginning and the end of the second period, and (iii) the third Low level during the third period, each of the first Low level and the third Low level being lower in electric potential than the second Low level, and in the second frame, the driving signal has (i) the first High level during the first period, (ii) the second Low level at the beginning and the end of the second period, and (iii) the third High level during the third period, each of the first High level and the third High level being higher in electric potential than the second High level.

According to the configuration, the first through fourth periods have respective lengths, and the electric potential level is set in each of the first through fourth periods. Therefore, when the time length of each of the fourth High and Low levels is sufficiently shorter than a possible normal length of the fourth period, the fourth High and Low levels can be assumed to appear approximately the same number of times until the following one (1) frame period, regardless of the generation timing of the timing signal for indicating start of the following one (1) frame period.

This brings about an effect of allowing the fourth period to have High level periods which appear almost the same number of times as Low level periods in the fourth period, regardless of the generation timing of the timing signal. It is therefore possible to obtain, throughout the time period of the pair of the first and second frames (i.e., throughout the whole display period), a desired relation between the sum of the time lengths of the High levels and the sum of the time lengths of the Low levels in the driving signal, even when the generation timing of the timing signal is unexpectedly shifted.

Moreover, since (i) the electric potential of each of the first High level and the third High level is higher than that of the second High level and (ii) the electric potential of each of the first Low level and the third Low level is lower than that of the second Low level, a speed of charging the loads by the driving signal is increased in the first period and the third period. It is accordingly possible to improve the charging rate of the loads with the driving signal in the sequential third period, the fourth period, and the first period across two frames. This makes it possible to prevent unevenness in the effective voltages applied to liquid crystal which unevenness would be caused due to a decrease in charging rate of the loads in the earliest period in one (1) frame period. With the configuration, a display can be carried out with the luminance which is uniform throughout the one (1) frame period.

This makes it possible to provide the method for driving the display device which can prevent the effective voltages applied to liquid crystal from differing between the positive polarity and the negative polarity, even when the generation timing of the timing signal is unexpectedly shifted.

Advantageous Effects of Invention

As described above, in the display device of the present invention in which a storage capacitor line is driven with a driving signal: the driving signal, which is generated in said display device, has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods; the first period starts based on a generation timing of a timing signal which determines a start timing of the one (1) frame period, the driving signal having any one of a first High level and a first Low level during the first period, and the first High level and the first Low level being alternated every frame period; in the second period, the electric potential level alternates between a second High level and a second Low level; during the third period, (i) the driving signal has a third High level when the driving signal has the first High level during the first period of the same frame or (ii) the driving signal has a third Low level when the driving signal has the first Low level during the first period of the same frame; in the fourth period, the electric potential level alternates between a fourth High level and a fourth Low level until a generation timing of the timing signal which determines a start timing of a following one (1) frame period; any adjacent two of the frame periods belong to a first frame and a second frame, respectively; in the first frame, the driving signal has (i) the first Low level during the first period, (ii) the second High level at the beginning and the end of the second period, and (iii) the third Low level during the third period, each of the first Low level and the third Low level being lower in electric potential than the second Low level; and in the second frame, the driving signal has (i) the first High level during the first period, (ii) the second Low level at the beginning and the end of the second period, and (iii) the third High level during the third period, each of the first High level and the third High level being higher in electric potential than the second High level.

This makes it possible to provide the display device which can prevent the effective voltages applied to liquid crystal from differing between the positive polarity and the negative polarity, even when the generation timing of the timing signal is unexpectedly shifted.

As described above, the method of the present invention for driving the display device, in which a storage capacitor line is driven with a driving signal, includes the step of: generating the driving signal, wherein the driving signal has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods, the first period starts based on a generation timing of a timing signal which determines a start timing of the one (1) frame period, the driving signal having any one of a first High level and a first Low level during the first period, and the first High level and the first Low level being alternated every frame period, in the second period, the electric potential level alternates between a second High level and a second Low level, during the third period, (i) the driving signal has a third High level when the driving signal has the first High level during the first period of the same frame or (ii) the driving signal has a third Low level when the driving signal has the first Low level during the first period of the same frame, in the fourth period, the electric potential level alternates between a fourth High level and a fourth Low level until a generation timing of the timing signal which determines a start timing of a following one (1) frame period, any adjacent two of the frame periods belong to a first frame and a second frame, respectively, in the first frame, the driving signal has (i) the first Low level during the first period, (ii) the second High level at the beginning and the end of the second period, and (iii) the third Low level during the third period, each of the first Low level and the third Low level being lower in electric potential than the second Low level, and in the second frame, the driving signal has (i) the first High level during the first period, (ii) the second Low level at the beginning and the end of the second period, and (iii) the third High level during the third period, each of the first High level and the third High level being higher in electric potential than the second High level.

This makes it possible to provide the method for driving the display device which can prevent the effective voltages applied to liquid crystal from differing between the positive polarity and the negative polarity, even when the generation timing of the timing signal is unexpectedly shifted.

DESCRIPTION OF EMBODIMENTS

The following describes one embodiment of the present invention with reference to FIGS. 1 through 8.

Figure 8:
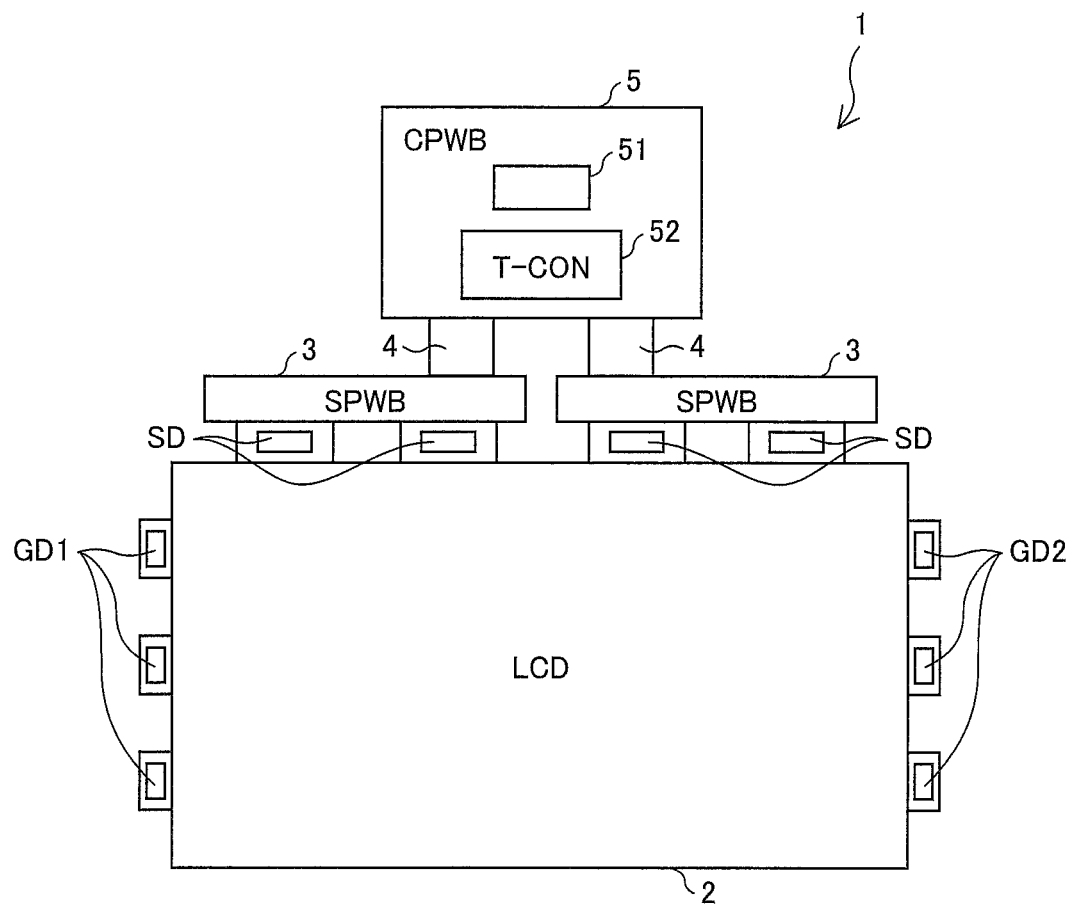
FIG. 8 is a block diagram illustrating a configuration of a display device, in accordance with an embodiment of the present invention.

FIG. 8 illustrates a configuration of a liquid crystal display device (display device) 1 of the present embodiment. The liquid crystal display device 1 includes a display panel 2, source print wiring boards (SPWB) 3, a plurality of source drivers (display drivers) SD, a plurality of gate drivers GD1, a plurality of gate drivers GD2, flexible wires 4, and a display control substrate (CPWB) 5 (see FIG. 8). Note that the display panel 2 and the other members can be arbitrarily arranged. For example, the display panel 2 and the other members may be provided on a single panel with an arbitrary combination. Alternatively, it may be possible that part of or all of the plurality of source drivers SD, the plurality of gate drivers GD1, the plurality of gate drivers GD2, and the display control substrate 5 (i) are provided on an external substrate such as a flexible print wiring board and (ii) are connected with a panel including the display panel 2.

Figure 9:
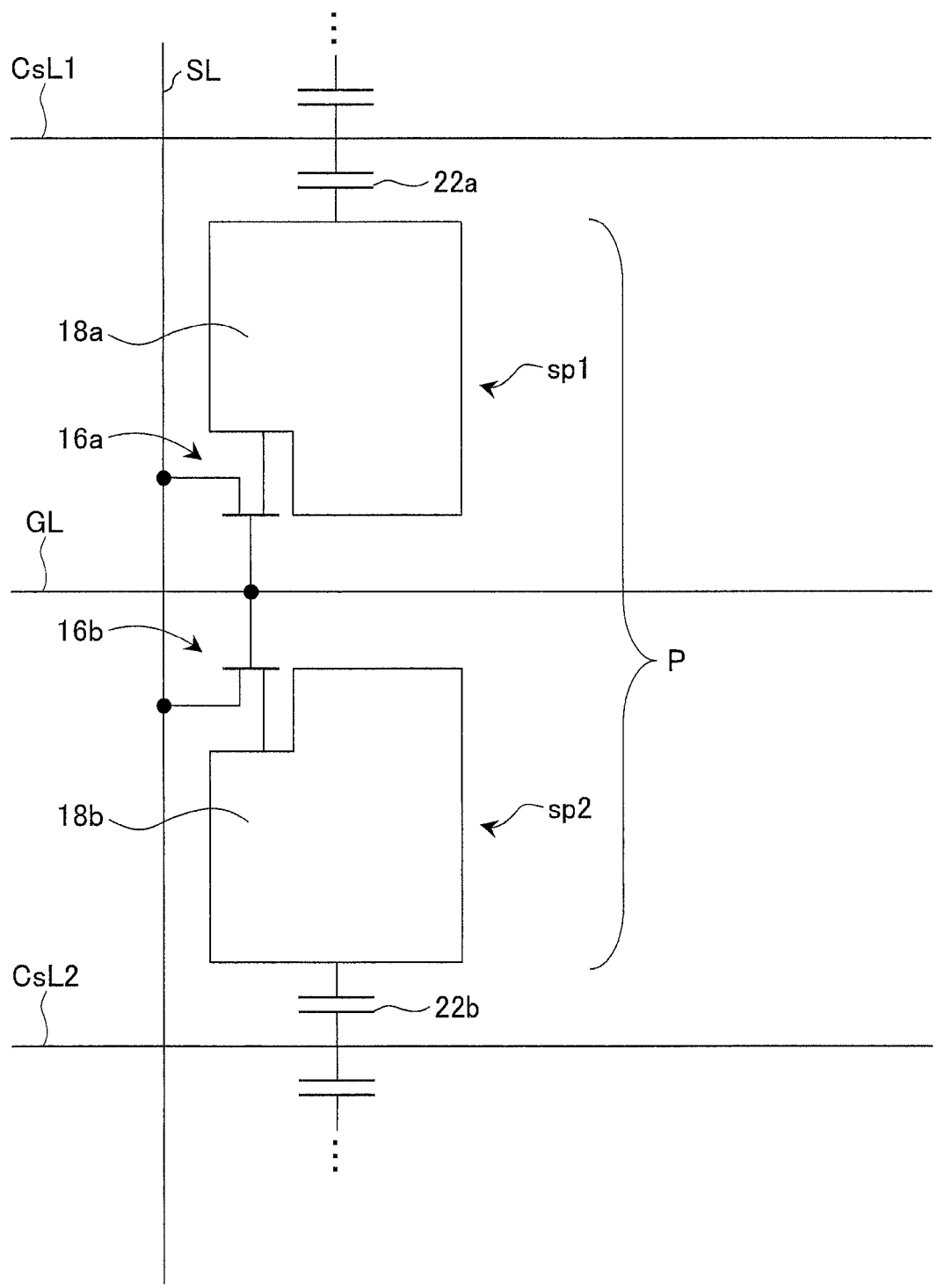
FIG. 9 is a circuit diagram illustrating a configuration of a picture element in a multi-picture-element driving method, in accordance with a conventional technique.
Figure 10:
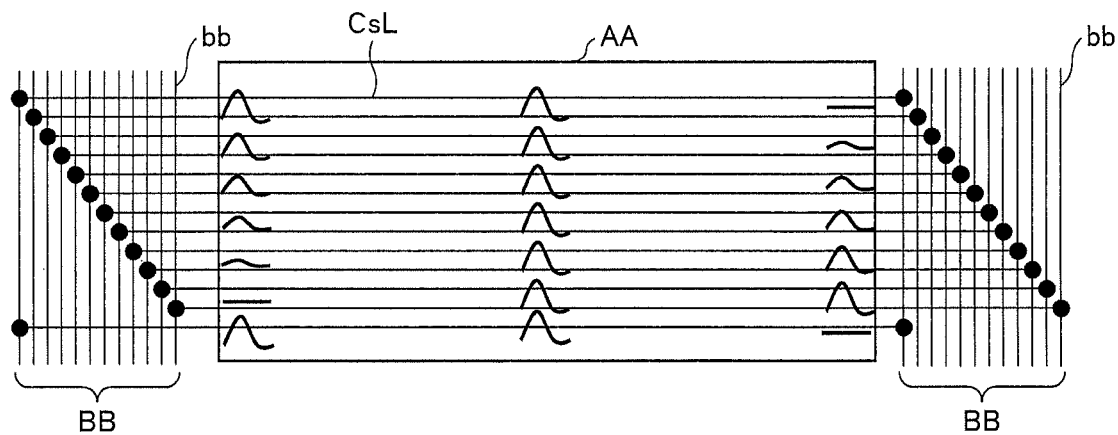
FIG. 10 is a plain view illustrating an arrangement of storage capacitor lines and CS trunk lines, in accordance with a conventional technique.
Figure 11:
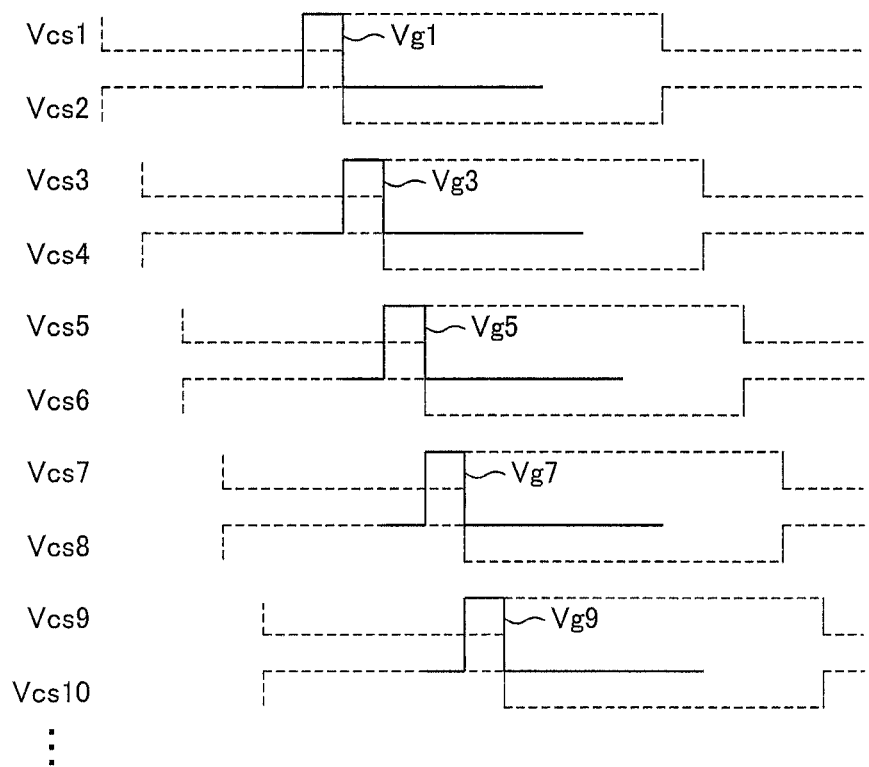
FIG. 11 is a waveform chart illustrating a waveform example of a storage capacitor voltage supplied to the picture element shown in FIG. 9.

The display panel 2 has (i) an active area AA in which a plurality of picture elements P, each of which is made up of sub-picture elements sp1 and sp2, are arranged in a matrix manner, (ii) a plurality of gate bus lines GL, (iii) a plurality of source bus lines SL, (iv) a plurality of storage capacitor lines CsL (such as CsL1 and CsL2), and (v) two CS trunk line groups BB (this arrangement of the constituent members is similar to that illustrated in FIGS. 9, 10, and 11).

As with the configuration shown in FIG. 9, the gate bus lines GL and the source bus lines SL are provided so as to intersect with each other and to be connected with the picture elements P. Moreover, in each of the picture elements P, the storage capacitor lines CsL1 and CsL2 are connected with the respective sub-picture elements sp1 and sp2. One of the two CS trunk line groups BB is provided in an area adjacent to one side of the active area AA in a direction in which the storage capacitor lines CsL (such as CsL1 and CsL2) extend. The other of the two CS trunk line groups BB is provided in an area adjacent to the other side of the active area AA in the direction in which the storage capacitor lines CsL extend. The storage capacitor lines CsL are connected with the two CS trunk line groups BB. Note that, alternatively, the CS trunk line group BB may be provided on only one of the sides of the active area AA.

The source drivers SD and the gate drivers GD1 and GD2 are connected with the display panel 2 in an SOF (System On Film) form. Here, the source drivers SD are connected with the display panel 2 on only one side of the display panel 2. The gate drivers GD1 are connected with the display panel 2 on one of two sides of the display panel 2 which two sides are perpendicular to the one side on which the source drivers SD are connected. The gate drivers GD2 are connected with the display panel 2 on the other of the two sides. Note that, the present embodiment is not limited in particular to this arrangement. The source drivers SD are further connected with the source print wiring boards 3 so as to receive corresponding display data from the source print wiring boards 3.

The source print wiring boards 3 are connected with the display control substrate 5 via the respective flexible wires 4. The display control substrate 5 includes a data processing/CS controlling section 51 and a timing controller 52. The display control substrate 5 supplies signals, data, and voltages, such as timing signals supplied to the source drivers SD and to the gate drivers GD1 and GD2, display data supplied to the source drivers SD, and storage capacitor voltages applied to the CS trunk line groups BB. The timing signals, which are used by the gate drivers GD1 and GD2, are supplied to the display panel 2 via the SOF constituted by the source print wiring boards 3 and the source drivers SD. Moreover, the storage capacitor voltages are applied to the CS trunk line groups BB, which are included in the display panel 2, via the SOF.

In the display control substrate 5, the data processing/CS controlling section 51 has sections such as LVDS (Low Voltage Differential Signaling) receiver/driver, a ghost correction processing section, a pseudo gradation generating section, a cross talk correction section, a gamma correction section, an overshooting processing section, a timing control section for storage capacitor voltage, and a timing control section for reverse polarity driving.

Figure 12:
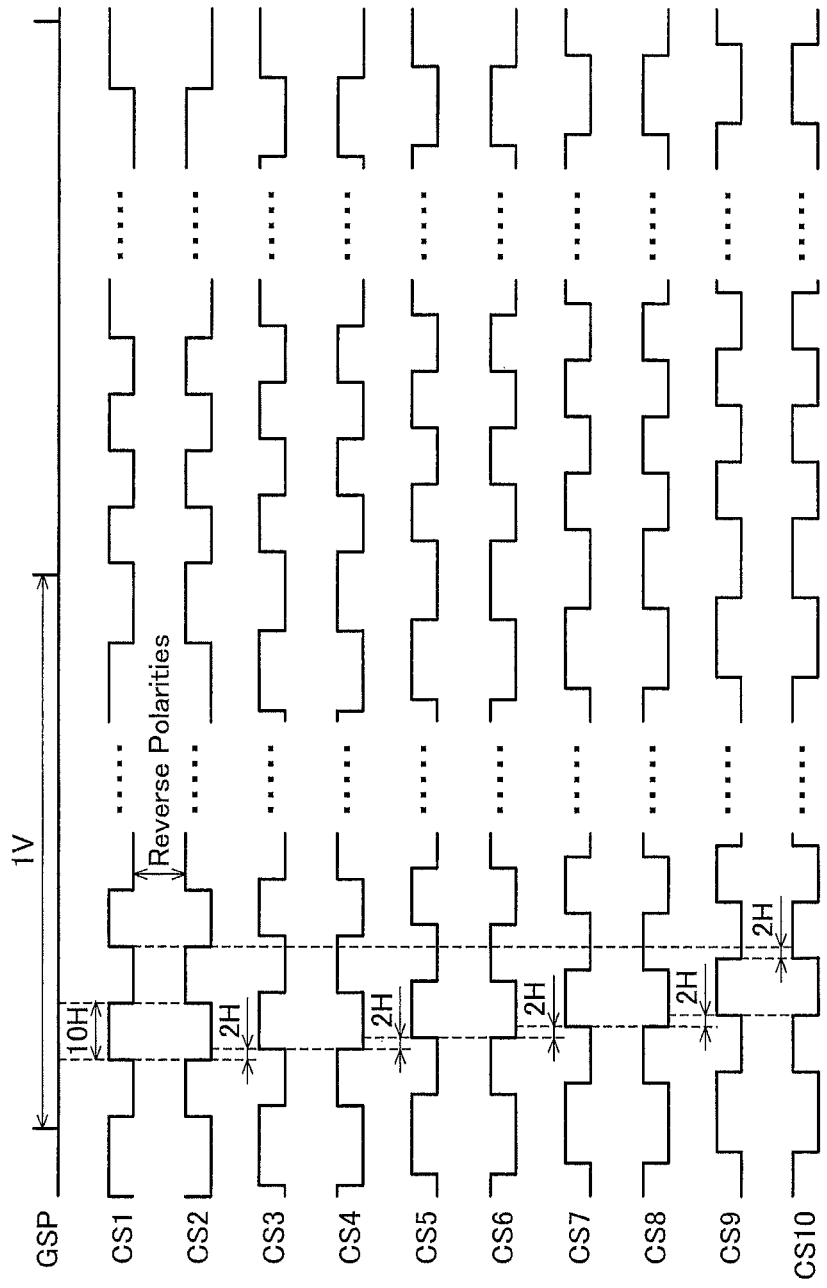
FIG. 12 is a waveform chart specifically illustrating a waveform example of a storage capacitor voltage, in accordance with a conventional technique.

The timing control section for storage capacitor voltage has a storage capacity supply circuit for generating a driving signal CS, which is a storage capacitor voltage used in an AC driving of a multi-picture-element driving display device. The timing control section for storage capacitor voltage supplies the driving signals CS, which have been generated in the storage capacity supply circuit, to the respective CS trunk lines bb. Here, in the AC driving, (i) a polarity is reversed for each frame and, (ii) in each one frame, a polarity of a data signal is reversed every plural sequential horizontal periods. Here, the driving signal CS is a binary signal in which a High level (corresponding to positive polarity) and a Low level (corresponding to negative polarity) repeatedly appear in one (1) frame period, as explained with reference to FIGS. 11 and 12. Alternatively, the driving signal CS may be a multilevel signal in which a plural degrees of High levels (corresponding to positive polarity) and a plural degrees of Low levels (corresponding to negative polarity) alternately appear in one (1) frame period. The polarities, at respective timings, of the driving signal CS in one (1) frame period are reversed for each frame. The driving signals CS include pairs of driving signals CS each of which pairs is made up of two driving signals CS having reversed phases. The phases of the respective pairs are set to be sequentially shifted. With the configuration, a predetermined number of phases of respective driving signals CS are provided so that every two of the predetermined number of phases is sequentially shifted.

However, the present embodiment is not limited to the above described AC driving. For example, it is possible to employ a general AC driving in which a data signal polarity is reversed in each horizontal line.

The timing control section for storage capacitor voltage determines, for each frame, start timings of the respective driving signals CS based on a generation timing of a gate start pulse GSP (timing signal) having a cycle of 1 vertical period (1V). The gate start pulse GSP is supplied to the timing control section for storage capacitor voltage at the same time as a generation of the gate start pulse GSP. When a start timing of one (1) frame is notified to the timing control section for storage capacitor voltage by the supplied gate start pulse GSP, the timing control section for storage capacitor voltage changes output waveforms of the respective driving signals CS so that polarities of each of the driving signals CS are reversed with respect to those in a followed frame. The generation timing of the gate start pulse GSP may be a rising edge timing of or a falling edge timing of the gate start pulse GSP.

The following describes an electric potential waveform of the driving signal CS in the present embodiment, with reference to waveform examples.

Waveform Example 1

Figure 4:
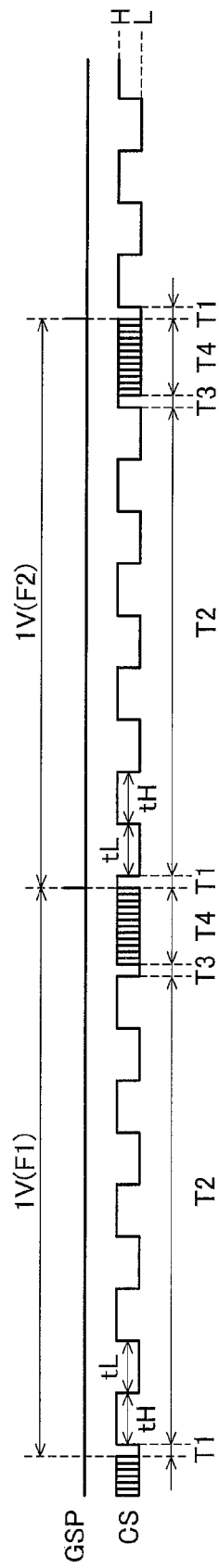
FIG. 4 is a waveform chart illustrating a first waveform example of a driving signal, in accordance with an embodiment of the present invention.

FIG. 4 is a waveform chart illustrating a first waveform example of the driving signal CS. The first waveform example shows an unloaded output waveform, which is a waveform of a driving signal CS generated by the storage capacity supply circuit, where the wires such as the CS trunk lines bb and the storage capacitor lines CsL, which are directly or indirectly connected to output terminals of the storage capacity supply circuit, are assumed to be loads. This first waveform example serves as a reference waveform for second and further waveform examples. Note that, in the descriptions below, each frame of a waveform has a plurality of periods including a High level period and a Low level period which alternately appear. The waveform of course includes a shifting electric potential which can be caused in a shift of electric potential level at each boundary between the plurality of periods and between the High level period and the Low level period.

A driving signal CS shown in FIG. 4 has a waveform in which one (1) frame period (1V) has sequential periods T1, T2, T3, and T4. The driving signal CS is a binary signal in which a High level (corresponding to a positive polarity) and a Low level (corresponding to a negative polarity) are alternately appear in the one (1) frame period made up of the periods T1, T2, T3, and T4. That is, in the periods T1, T2, T3, and T4, the High levels have identical electric potentials and the Low levels have identical electric potentials. However, the present embodiment is not limited to this. For example, the electric potential of the High level and the electric potential of the Low level can be arbitrarily set in each of the periods T1, T2, T3, and T4.

The period T1 (first period) starts in sync with a start timing of one (1) frame period of the driving signal CS. The period T1 is a High level period or a Low level period, and the High level period and the Low level period are switched for each frame. In a case where the period T1 is the High level period, the driving signal CS has an applied electric potential H which is applied by the storage capacity supply circuit. Meanwhile, in a case where the period T1 is the Low level period, the driving signal CS has an applied electric potential L which is applied by the storage capacity supply circuit.

A frame in which the period T1 is the Low level period is assumed to be a first frame F1, whereas a frame in which the period T1 is the High level period is assumed to be a second frame F2. The first frame F1 and the second frame F2 alternately appear for each frame.

The period T2 (second period) follows the period T1. In the period T2, the electric potential level of the driving signal CS is repeatedly switched between the High level and the Low level. In the period T2, the driving signal CS has, as the High level, the applied electric potential H which is applied by the storage capacity supply circuit and has, as the Low level, the applied electric potential L applied by the storage capacity supply circuit.

The period T2 has (i) High periods tH each of which is the High level period and (ii) Low periods tL each of which is the Low level period (see FIG. 4). Each of the High periods tH and each of the Low periods tL appear alternately. In the first frame F1, the beginning and the end of the period T2 are the High periods tH. In the second frame F2, the beginning and the end of the period T2 are the Low periods tL.

The High periods tH may have different lengths, and the Low periods tL may have different lengths. Moreover, each of the High periods tH may have a length which is different from that of each of the Low periods tL. Moreover, the number of the High periods tH in the first frame F1 may be different from the number of the Low periods tL in the second frame F2, and the number of the Low periods tL in the first frame F1 may be different from the number of the High periods tH in the second frame F2. This is because (i) the driving signal CS is supplied so as to adjust an electric potential of a picture element electrode after a data signal is written into the picture element, and (ii) it is possible to arbitrarily design when and how much degree the electric potential of the picture element electrode is adjusted. However, in this example, the driving signal CS has a waveform in which polarities in the period T2 of the first frame F1 is reversed with respect to those of the second frame F2. The length of each of the High periods tH is set to a predetermined length of, for example, 10 horizontal periods, and the length of each of the Low periods tL is set to a predetermined length of, for example, 10 horizontal periods, as above described with reference to FIG. 12.

In this case, assuming that successive one (1) first frame F1 and one (1) second frame F2 constitute a frame pair FP, it is easy to set the sum of the lengths of the High periods tH to be equal to or close to that of the Low periods tL, in the periods T2 of the entire frame pair FP. In the waveform shown in FIG. 4, the sum of the lengths of the High periods tH is equal to that of the Low periods tL. Note that the frame pair FP (i) may be configured by a first frame F1 and a following second frame F2 or (ii) may be configured by a second frame F2 and a following first frame F1.

The period T3 (third period) follows the period T2. The period T3 is a High level period when the period T1 in the same frame has been the High level period. On the other hand, the period T3 is a Low level period when the period T1 in the same frame has been the Low level period. In the period T3, the driving signal CS (i) has, as the High level, the applied electric potential H which is applied by the storage capacity supply circuit or (ii) has, as the Low level, the applied electric potential L applied by the storage capacity supply circuit. Therefore, in this Waveform Example 1, the High level in the period T3 is the applied electric potential which is identical with that of the High level in the period T1, and the Low level in the period T3 is the applied electric potential which is identical with that of the Low level in the period T1. However, this merely exemplifies the present embodiment, and the present embodiment is not limited to this. For example, the High level in the period T3 may have an applied electric potential which is different from that of the High level in the period T1, and the Low level in the period T3 may have an applied electric potential which is different from that of the Low level in the period T1.

Figure 13:
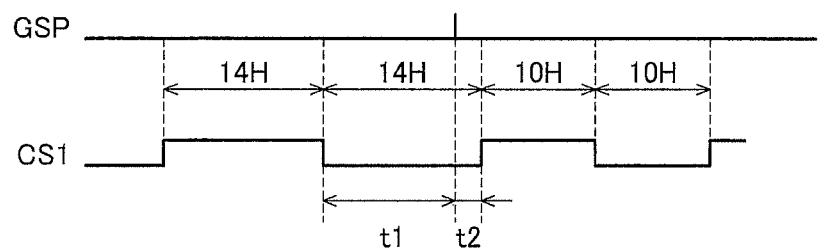
FIG. 13 is a waveform chart illustrating a waveform of a driving signal in a case where a generation timing of a timing signal is normal, in accordance with a conventional technique.
Figure 14:
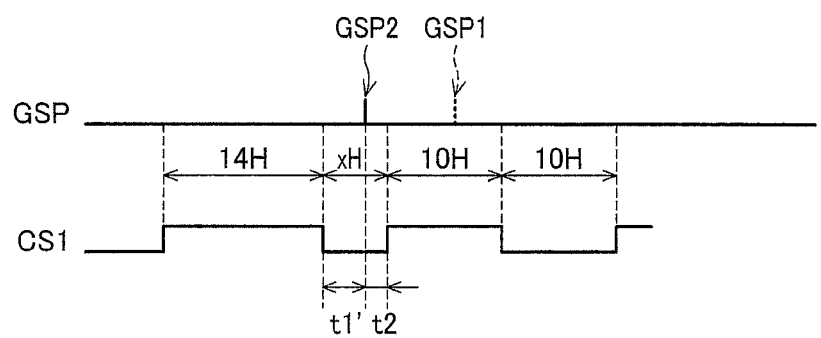
FIG. 14 is a waveform chart illustrating a waveform of a driving signal in a case where a generation timing of a timing signal is shifted, in accordance with the conventional technique.

In this Waveform Example 1, the period T1 has the length which is equal to that of the period T3. However, this merely exemplifies the present embodiment, and the present embodiment is not limited to this. Therefore, the period T1 may have a length which is different from that of the period T3. Each of the lengths of the respective periods T1 and T3 is set to a predetermined length such as the period t2, which is described above with reference to FIGS. 13 and 14.

The period T4 (fourth period) follows the period T3. In the period T4, the electric potential level of the driving signal CS alternates between the High level and the Low level until a generation timing of a gate start pulse GSP which determines a start timing of a following one (I) frame period. In the period T4, the driving signal CS (i) has, as the High level, the applied electric potential H which is applied by the storage capacity supply circuit and (ii) has, as the Low level, the applied electric potential L applied by the storage capacity supply circuit.

Lengths of the respective High and Low level periods in the period T4 can be set arbitrarily. Here, the High and Low level periods have identical lengths. Moreover, the length of each of the High and Low level periods in the period T4 is set to be shorter than that of each of the periods T1 and T3. It is preferable to set the length of each of the High and Low level periods in the period T4 as short as possible, provided that the period T4 is assigned to a remaining short period in one (1) frame period.

When the length of each of the High and Low level periods in the period T4 is sufficiently shorter than a possible normal length of the period T4, the High level period and the Low level period can be assumed to appear approximately the same number of times until the following one (1) frame period, regardless of the generation timing of the gate start pulse GSP at which the following one (1) frame period starts. Whether or not the High and Low level periods can be assumed to appear approximately the same number of times depends on a ratio between (i) the length of the whole period T4 and (ii) the length of each of the High and Low level periods in the period T4. Note that, such a length of each of the High and Low level periods in the period T4 can be designed as appropriate in accordance with specifications of a display device.

In this regard, the present embodiment is not limited to the foregoing configuration in which the polarities of the driving signal CS are reversed with respect to the followed frame. In other words, the order of appearance of the High level period and the Low level period in the period T4 can be arbitrarily set in each of the first frame F1 and the second frame F2. However, it is preferable that the order of appearance in the first frame F1 is reversed with respect to that in the second frame F2, because the number of High level periods is more likely to be closer to that of the Low level periods in the whole periods T4 of the frame pair FP.

When the length of each of the High and Low level periods in the period T4 is set to be shorter than each of the periods T1 and T3, it becomes easy to assign the periods in one (1) frame period other than the period T2 to non-display periods in an effective display area. This makes it possible to prevent a visible display from being adversely affected by the irregular switching of the electric potential levels of the driving signal CS in the periods T1, T3, and T4. Therefore, it is advantageous to set the length of each of the periods T1 and T3 to be shorter than each of the High period tH and the Low period tL in the period T2, because the periods T1, T3, and T4 can be easily assigned to the non-display periods in the effective display area.

As above described, the periods T1 through T4 have respective lengths, and the electric potential level of the driving signal CS is set in each of the periods T1 through T4. This brings about such an effect of allowing the period T4 to be such that a difference between the number of the High level periods and the number of the Low level periods appearing in the period T4 is not so dependent on the generation timing of the gate start pulse GSP. It is therefore possible to obtain, throughout the period of the frame pair FP in the driving signal CS (i.e., throughout the whole display period), a desired relation between the sum of the lengths of the High level periods and the sum of the lengths of the Low level periods in the driving signal CS, even when the generation timing of the gate start pulse GSP is unexpectedly shifted. For example, the sum of the lengths of the High level periods in the driving signal CS may be set to be equal to the sum of the lengths of the Low level periods in the driving signal CS by adjusting the lengths of the respective periods, provided that an effective voltage applied to liquid crystal with the positive polarity becomes equal to that with the negative polarity by the configuration. Alternatively, the sum of the lengths of the High level periods in the driving signal CS may be set to be slightly different from the sum of the lengths of the Low level periods in the driving signal CS by adjusting the lengths of the respective periods, provided that an effective voltage applied to liquid crystal with the positive polarity becomes equal to that with the negative polarity by the configuration. The relation between the sum of the lengths of the High level periods and the sum of the lengths of the Low level periods may be determined in accordance with a demanded or acceptable function of a display device.

In order to prevent the effective voltages applied to liquid crystal from differing between the positive polarity and the negative polarity, the sum of the lengths of the High level periods, the sum of the lengths of the Low level periods, and the electric potential level in the whole periods are set so that, for example, an average electric potential level of the driving signal CS in the whole periods becomes equal to a common electric potential with respect to the High level and the Low level of the driving signal CS, i.e., equal to a midpoint potential between the High level and the Low level of the driving signal CS.

With the configuration in which one (1) frame period is made up of the periods T1 through T4, it is possible to prevent the effective voltages applied to liquid crystal from differing between the positive polarity and the negative polarity, even when the generation timing of the gate start pulse GSP is unexpectedly shifted.

Waveform Example 2

Figure 1:
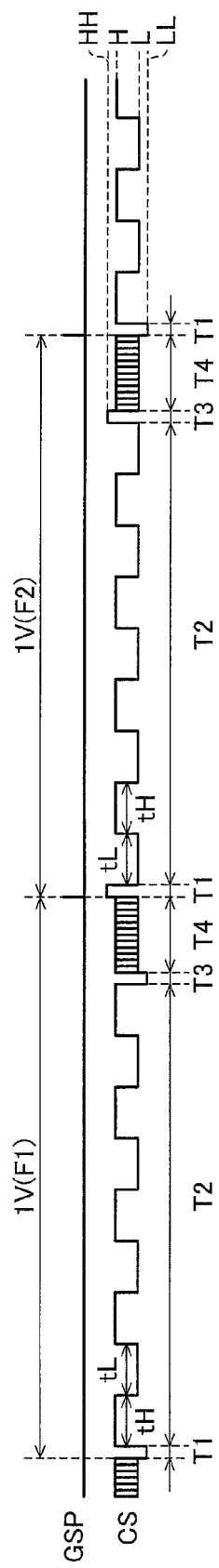
FIG. 1 is a waveform chart illustrating a second waveform example of a driving signal, in accordance with an embodiment of the present invention.
Figure 5:
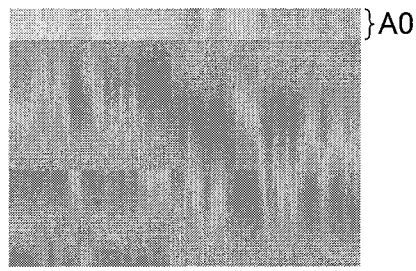
FIG. 5 is a view for explaining a first phenomenon which is caused in a display due to a driving signal.

The following describes a second waveform example of the driving signal CS, with reference to FIGS. 1 and 5.

When a driving signal CS is supplied to a CS trunk line bb, a wiring capacitor of the CS trunk line bb (serving as the load) and a storage capacitor line CsL (serving as the load) connected with the CS trunk line bb is to be charged. Therefore, it requires time, which corresponds to a time constant of a signal delay, until the CS trunk line bb and the storage capacitor line CsL have respective target voltages. The required time is, for example, approximately 10 horizontal periods. In Waveform Example 1 described above with reference to FIG. 4, the driving signal CS has the sequential periods T3, T4, and T1 across two frames. In the configuration, a charging rate at the end timing of the period T1 varies depending on the lengths of the respective periods T3, T4, and T1 and the electric potential level in each of the periods T3, T4, and T1, i.e., depending on a degree of DC component included in the waveform in the periods T3, T4, and T1. This may cause a case in which the target CS trunk line bb and the target storage capacitor line CsL do not attain the respective target voltages (in this case, the common electric potential with respect to the High and Low levels of the driving signal CS) by the end of the period T1.

In such a case, there occurs a phenomenon in which display luminance during a predetermined period (e.g., approximately 10 horizontal periods) from the beginning of one (1) frame period becomes different after the predetermined period, as indicated by an area A0 in FIG. 5.

In order to prevent the phenomenon, (i) the High level in each of the periods T3 and T1, which are indicated by the unloaded output waveform of the driving signal CS, is set to have an applied electric potential HH which is higher than the High level (i.e., applied electric potential H) in the second period and (ii) the Low level in each of the periods T3 and T1 is set to have an applied electric potential LL which is lower than the Low level (i.e., applied electric potential L) in the second period (see FIG. 1). With the configuration, the charging in the periods T3 and T1 is speeded up.

It is accordingly possible to increase the charging rate of the CS trunk line bb and the storage capacitor line CsL with the driving signal CS in the sequential periods T3, T4, and T1. This makes it possible to prevent unevenness in the effective voltage applied to liquid crystal which unevenness would be caused due to a decrease in the charging rate of the loads in the earliest period in one (I) frame period. With the configuration, a display can be carried out with the luminance which is uniform throughout the one (1) frame period.

When the driving signal CS has the electric potential level which varies between (i) the period T2 and (ii) the periods T3 and T1 among the sequential periods T3, T4, and T1 across two frames, the voltage, which is charged in the loads, can follow the driving signal waveform more faithfully. Therefore, the configuration of the display device can be simplified by setting the High and Low levels in the period T4 to have respective applied electric potentials which are equal to those of the respective High and Low levels in the period T2.

Waveform Example 3

Figure 2:
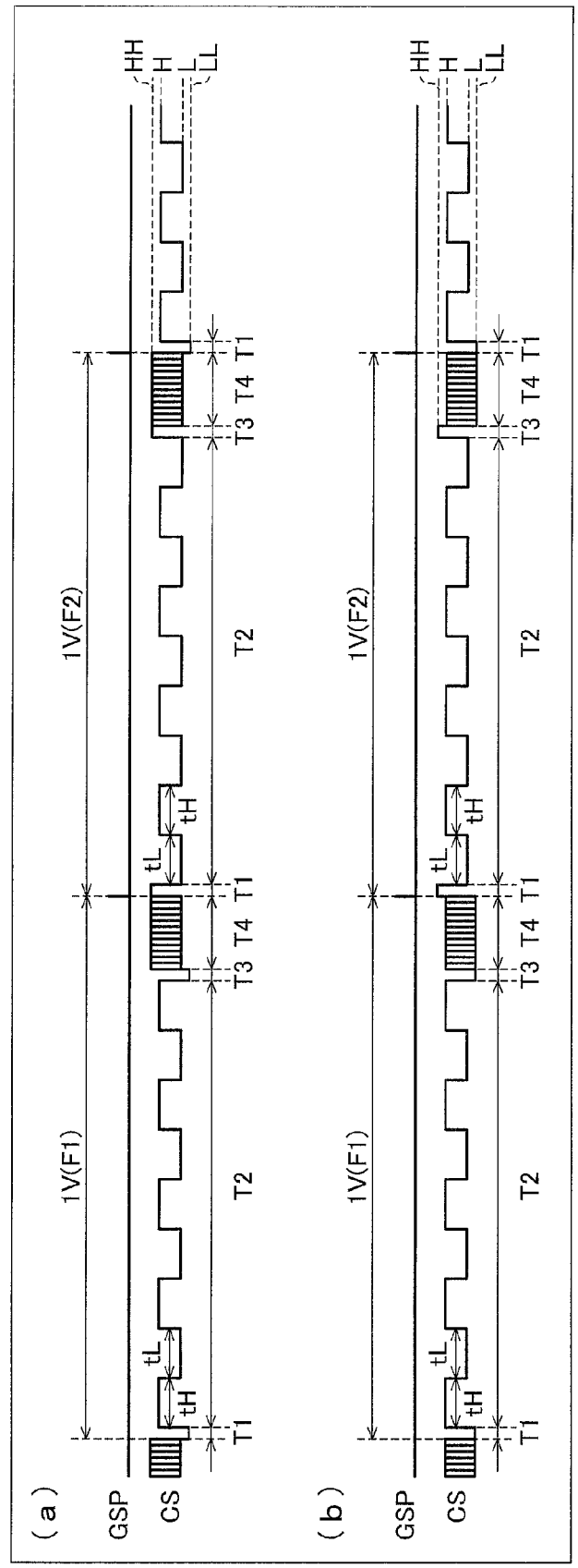
FIG. 2 is a waveform chart illustrating a third waveform example of a driving signal in accordance with an embodiment of the present invention, where (a) illustrates a waveform in which a High level in a fourth period is heightened and (b) illustrates a waveform in which a Low level in the fourth period is lowered.
Figure 6:
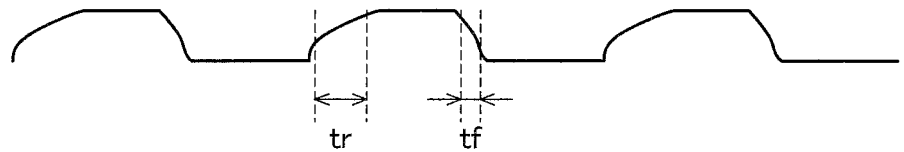
FIG. 6 is a waveform chart for explaining a waveform distortion of a driving signal.
Figure 7:
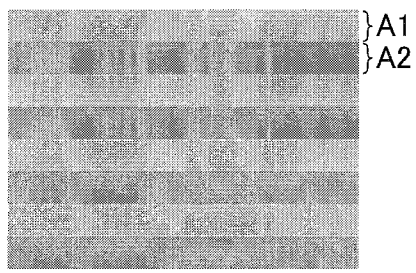
FIG. 7 is a view for explaining a second phenomenon which is caused in a display due to a driving signal.

The following describes a third waveform example of the driving signal CS, with reference to FIGS. 2, 6, and 7.

Depending on the configuration of the display device, asymmetric distortion, in which a period tr of a rising edge to the High level is shorter than a period tf of a falling edge, appears in an on-load output waveform of the driving signal CS (see FIG. 6), which is a waveform of a state where the driving signal CS is being supplied to the loads from the storage capacity supply circuit. In such a case, there may occur a phenomenon in which horizontal stripes appears on a displayed screen because the display luminance varies every time the polarity of the driving signal CS is reversed in one (1) frame period, as indicated by areas A1 and A2 in FIG. 7.

In order to prevent the phenomenon, in a case where, for example, an average potential of the on-load output waveform of the driving signal CS is biased toward the negative polarity side with respect to the common electric potential of the driving signal CS, the High level in the period T4 of the unloaded output waveform of the driving signal CS is set to have an electric potential higher than that of the High level in the period T2 (see (a) of FIG. 2), unlike the Waveform Example 1 shown in FIG. 1. That is, the High level in the period T4 is set to have an applied electric potential HH which is higher than the applied electric potential H of the High level in the period T2. The electric potential of the High level in the period T4 may be either equal to or different from that of the High level in the period T3. For example, (a) of FIG. 2 illustrates a waveform in which the High level in the period T4 and the High level in the period T3 have the applied electric potential HH.

With the configuration, the average potential of the on-load output waveform of the driving signal CS becomes equal to or close to the common electric potential of the driving signal CS. This makes it possible to prevent the effective voltages applied to liquid crystal from differing between the positive polarity and the negative polarity. It is therefore possible to prevent the horizontal stripes shown in FIG. 7.

In this case, the driving signal CS is a multilevel signal which has (i) plural degrees of High levels (applied electric potentials H and HH) corresponding to the positive polarity and (ii) plural degrees of Low levels (applied electric potentials L and LL) corresponding to the negative polarity, where each of the plural degrees of High levels and each of the plural degrees of Low levels alternately appear in one (1) frame period.

Alternately, in a case where the average potential of the on-load output waveform of the driving signal CS is biased toward the positive polarity side with respect to the common electric potential of the driving signal CS, the Low level in the period T4 of the unloaded output waveform of the driving signal CS is set to have an electric potential lower than that of the Low level in the period T2 (see (b) of FIG. 2), unlike the Waveform Example 1 shown in FIG. 1. That is, the Low level in the period T4 is set to have an applied electric potential LL which is lower than the applied electric potential L of the Low level in the period T2. The electric potential of the Low level in the period T4 may be either equal to or different from that of the Low level in the period T3. Here, for example, the Low level in the period T4 and the Low level in the period T3 have the applied electric potential LL. With the configuration, the average potential of the on-load output waveform of the driving signal CS becomes equal to the common electric potential of the driving signal CS. This makes it possible to prevent the effective voltages applied to liquid crystal from differing between the positive polarity and the negative polarity. It is therefore possible to prevent the horizontal stripes shown in FIG. 7.

Waveform Example 4

Figure 3:
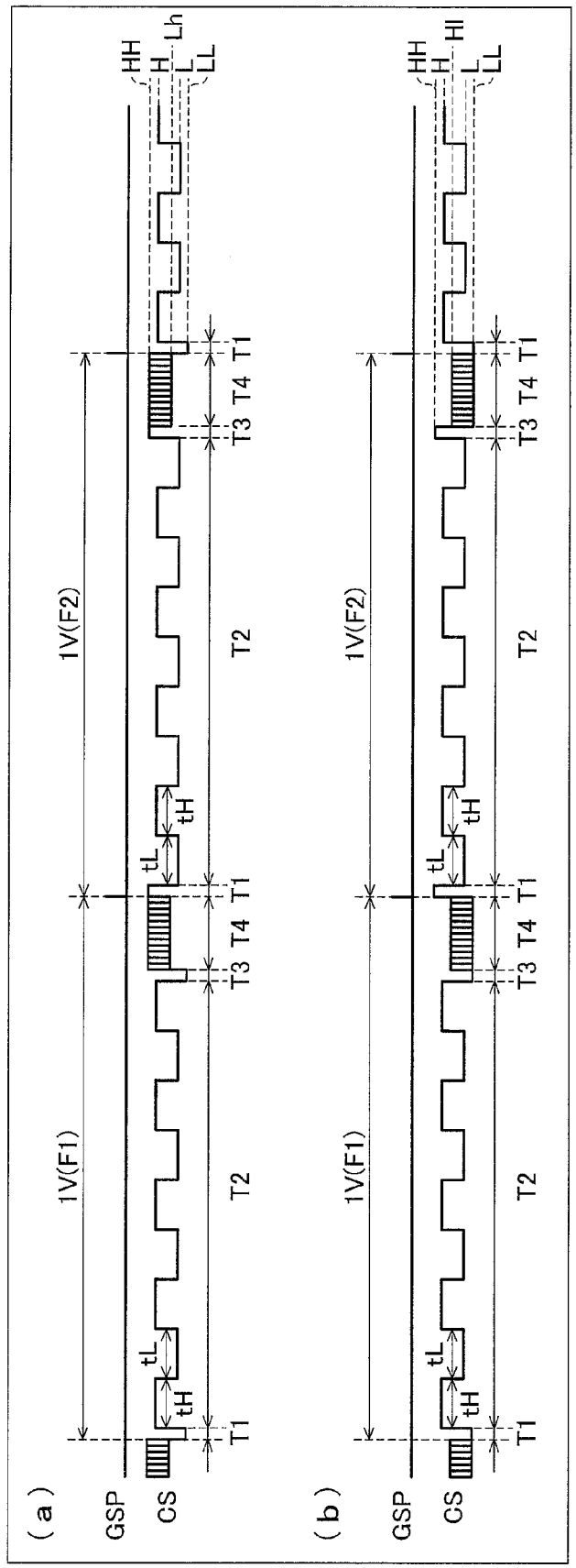
FIG. 3 is a waveform chart illustrating a fourth waveform example of a driving signal in accordance with an embodiment of the present invention, where (a) illustrates a waveform in which the High level in the fourth period is largely heightened and (b) illustrates a waveform in which the Low level in the fourth period is largely lowered.

The following describes a fourth waveform example of the driving signal CS with reference to FIG. 3.

A waveform example illustrated in (a) of FIG. 3 is basically identical to the unloaded output waveform of the driving signal CS of Waveform Example 2 shown in (a) of FIG. 2, except that the Low level in the period T4 is set to have an applied electric potential Lh which is higher than the Low level (applied electric potential L) in the period T2. The Low level in the period T4 does not need to be the negative polarity with respect to the common electric potential of the driving signal CS, provided that the Low level in the period T4 has an electric potential which is lower than that of the High level in the period T4. With the configuration, even in a case where the on-load output waveform of the driving signal CS is biased toward the negative polarity side as shown in FIG. 6 and accordingly the charging rate of the loads are largely decreased on the positive polarity level side of the driving signal CS, it is possible to appropriately compensate the decrease in the charging rate.

A waveform example illustrated in (b) of FIG. 3 is basically identical to the unloaded output waveform of the driving signal CS of Waveform Example 2 shown in (b) of FIG. 2, except that the High level in the period T4 is set to have an applied electric potential Hl which is lower than the High level (applied electric potential H) in the period T2. The High level in the period T4 does not need to be the positive polarity with respect to the common electric potential of the driving signal CS, provided that the High level in the period T4 has an electric potential which is higher than that of the Low level in the period T4. With the configuration, even in a case where the on-load output waveform of the driving signal CS is biased toward the positive polarity side on the contrary to the waveform shown in FIG. 6 and accordingly the charging rate of the loads are largely decreased on the negative polarity level side of the driving signal CS, it is possible to appropriately compensate the decrease in the charging rate.

As above, the present embodiment is discussed.

Note that a display driving method of the display device is not limited to the multi-picture-element driving, and therefore another driving method may be employed in which an arbitrary picture element configuration is used.

In order to attain the object, in a display device of the present invention in which a storage capacitor line is driven with a driving signal: the driving signal, which is generated in said display device, has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods; the first period starts based on a generation timing of a timing signal which determines a start timing of the one (1) frame period, the driving signal having any one of a first High level and a first Low level during the first period, and the first High level and the first Low level being alternated every frame period; in the second period, the electric potential level alternates between a second High level and a second Low level; during the third period, (i) the driving signal has a third High level when the driving signal has the first High level during the first period of the same frame or (ii) the driving signal has a third Low level when the driving signal has the first Low level during the first period of the same frame; in the fourth period, the electric potential level alternates between a fourth High level and a fourth Low level until a generation timing of the timing signal which determines a start timing of a following one (1) frame period; any adjacent two of the frame periods belong to a first frame and a second frame, respectively; in the first frame, the driving signal has (i) the first Low level during the first period, (ii) the second High level at the beginning and the end of the second period, and (iii) the third Low level during the third period, each of the first Low level and the third Low level being lower in electric potential than the second Low level; and in the second frame, the driving signal has (i) the first High level during the first period, (ii) the second Low level at the beginning and the end of the second period, and (iii) the third High level during the third period, each of the first High level and the third High level being higher in electric potential than the second High level.

According to the configuration, the first through fourth periods have respective lengths, and the electric potential level is set in each of the first through fourth periods. Therefore, when the time length of each of the fourth High and Low levels is sufficiently shorter than a possible normal length of the fourth period, the fourth High and Low levels can be assumed to appear approximately the same number of times until the following one (1) frame period, regardless of the generation timing of the timing signal for indicating start of the following one (1) frame period.

This brings about an effect of allowing the fourth period to have High level periods which appear almost the same number of times as Low level periods in the fourth period, regardless of the generation timing of the timing signal. It is therefore possible to obtain, throughout the time period of the pair of the first and second frames (i.e., throughout the whole display period), a desired relation between the sum of the time lengths of the High levels and the sum of the time lengths of the Low levels in the driving signal, even when the generation timing of the timing signal is unexpectedly shifted.

Moreover, since (i) the electric potential of each of the first High level and the third High level is higher than that of the second High level and (ii) the electric potential of each of the first Low level and the third Low level is lower than that of the second Low level, a speed of charging the loads by the driving signal is increased in the first period and the third period. It is accordingly possible to improve the charging rate of the loads with the driving signal in the sequential third period, the fourth period, and the first period across two frames. This makes it possible to prevent unevenness in the effective voltages applied to liquid crystal which unevenness would be caused due to a decrease in the charging rate of the loads in the earliest period in one (1) frame period. With the configuration, a display can be carried out with the luminance which is uniform throughout the one (1) frame period.

This makes it possible to provide the display device which can prevent the effective voltages applied to liquid crystal from differing between the positive polarity and the negative polarity, even when the generation timing of the timing signal is unexpectedly shifted.

In order to attain the object, in the display device of the present invention, the fourth High level and the second High level have identical applied electric potentials; and the fourth Low level and the second Low level have identical applied electric potentials.

According to the configuration, when the driving signal has the electric potential level which varies between (i) the second period and (ii) the third and first periods among the sequential third, fourth, and first periods across two frames, the voltage, which is charged in the loads, can follow the driving signal waveform more faithfully. Therefore, the configuration of the display device can be simplified by setting the fourth High and Low levels to have respective applied electric potentials which are equal to those of the respective second High and Low levels.

In order to attain the object, in the display device of the present invention, the fourth High level is higher in electric potential than the second High level; and the fourth Low level and the second Low level have identical applied electric potentials.

With the configuration, an average potential of an on-load output waveform of the driving signal can be set to equal to or close to the common electric potential of the driving signal, in a case where the average potential of the on-load output waveform is biased toward the negative polarity side with respect to the common electric potential. Accordingly, the effective voltage applied to liquid crystal with the positive polarity can be set to be equal to that with the negative polarity. It is therefore possible to prevent the horizontal stripes in the displayed screen.

In order to attain the object, in the display device of the present invention, the fourth High level and the second High level have identical applied electric potentials; and the fourth Low level is lower in electric potential than the second Low level.

With the configuration, an average potential of an on-load output waveform of the driving signal can be set to equal to or close to the common electric potential of the driving signal, in a case where the average potential of the on-load output waveform is biased toward the positive polarity side with respect to the common electric potential. Accordingly, the effective voltage applied to liquid crystal with the positive polarity can be set to be equal to that with the negative polarity. It is therefore possible to prevent the horizontal stripes in the displayed screen.

In order to attain the object, in the display device of the present invention, the fourth High level is higher in electric potential than the second High level; and the fourth Low level is higher in electric potential than the second Low level.

With the configuration, an average potential of an on-load output waveform of the driving signal can be set to equal to or close to the common electric potential of the driving signal, even in a case where the charging rate of the loads is largely decreased on the positive polarity level side of the driving signal due to asymmetric distortion in which the average potential of the on-load output waveform is biased toward the negative polarity side with respect to the common electric potential. Accordingly, the effective voltage applied to liquid crystal with the positive polarity can be set to be equal to that with the negative polarity. That is, such a decrease in charging rate can be appropriately compensated. It is therefore possible to prevent the horizontal stripes in the displayed screen.

In order to attain the object, in the display device of the present invention, the fourth High level is lower in electric potential than the second High level; and the fourth Low level is lower in electric potential than the second Low level.

With the configuration, an average potential of an on-load output waveform of the driving signal can be set to equal to or close to the common electric potential of the driving signal, even in a case where the charging rate of the loads is largely decreased on the negative polarity level side of the driving signal due to asymmetric distortion in which the average potential of the on-load output waveform is biased toward the positive polarity side with respect to the common electric potential. Accordingly, the effective voltage applied to liquid crystal with the positive polarity can be set to be equal to that with the negative polarity. That is, such a decrease in charging rate can be appropriately compensated. It is therefore possible to prevent the horizontal stripes in the displayed screen.

In order to attain the object, in the display device of the present invention, each of the first period and the third period is shorter than a time length of each of the second High level and the second Low level.

According to the configuration, each of the first period and the third period is set to be shorter than a time length of each of the second High level and the second Low level. It is therefore possible to easily assign the periods other than the second period in one (1) frame period to non-display periods in the effective display area. This makes it possible to prevent a visible display from being adversely affected by the irregular switching of the electric potential levels of the driving signal in the first, third, and fourth periods.

In order to attain the object, in the display device of the present invention, a time length of each of the fourth High level and the fourth Low level is shorter than each of the first period and the third period.

According to the configuration, a time length of each of the fourth High level and the fourth Low level is shorter than each of the first period and the third period. It is therefore possible to easily assign the periods other than the second period in one (1) frame period to non-display periods in the effective display area. This makes it possible to prevent a visible display from being adversely affected by the irregular switching of the electric potential levels of the driving signal in the first, third, and fourth periods.

In order to attain the object, a method of the present invention for driving a display device, in which a storage capacitor line is driven with a driving signal, includes the step of: generating the driving signal, wherein the driving signal has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods, the first period starts based on a generation timing of a timing signal which determines a start timing of the one (1) frame period, the driving signal having any one of a first High level and a first Low level during the first period, and the first High level and the first Low level being alternated every frame period, in the second period, the electric potential level alternates between a second High level and a second Low level, during the third period, (i) the driving signal has a third High level when the driving signal has the first High level during the first period of the same frame or (ii) the driving signal has a third Low level when the driving signal has the first Low level during the first period of the same frame, in the fourth period, the electric potential level alternates between a fourth High level and a fourth Low level until a generation timing of the timing signal which determines a start timing of a following one (1) frame period, any adjacent two of the frame periods belong to a first frame and a second frame, respectively, in the first frame, the driving signal has (i) the first Low level during the first period, (ii) the second High level at the beginning and the end of the second period, and (iii) the third Low level during the third period, each of the first Low level and the third Low level being lower in electric potential than the second Low level, and in the second frame, the driving signal has (i) the first High level during the first period, (ii) the second Low level at the beginning and the end of the second period, and (iii) the third High level during the third period, each of the first High level and the third High level being higher in electric potential than the second High level.

According to the configuration, the first through fourth periods have respective lengths, and the electric potential level is set in each of the first through fourth periods. Therefore, when the time length of each of the fourth High and Low levels is sufficiently shorter than a possible normal length of the fourth period, the fourth High and Low levels can be assumed to appear approximately the same number of times until the following one (1) frame period, regardless of the generation timing of the timing signal for indicating start of the following one (1) frame period.

This brings about an effect of allowing the fourth period to have High level periods which appear almost the same number of times as Low level periods in the fourth period, regardless of the generation timing of the timing signal. It is therefore possible to obtain, throughout the time period of the pair of the first and second frames (i.e., throughout the whole display period), a desired relation between the sum of the time lengths of the High levels and the sum of the time lengths of the Low levels in the driving signal, even when the generation timing of the timing signal is unexpectedly shifted.

Moreover, since (i) the electric potential of each of the first High level and the third High level is higher than that of the second High level and (ii) the electric potential of each of the first Low level and the third Low level is lower than that of the second Low level, a speed of charging the loads by the driving signal is increased in the first period and the third period. It is accordingly possible to improve the charging rate of the loads with the driving signal in the sequential third period, the fourth period, and the first period across two frames. This makes it possible to prevent unevenness in the effective voltages applied to liquid crystal which unevenness would be caused due to a decrease in the charging rate of the loads in the earliest period in one (1) frame period. With the configuration, a display can be carried out with the luminance which is uniform throughout the one (1) frame period.

This makes it possible to provide the method for driving the display device which can prevent the effective voltages applied to liquid crystal from differing between the positive polarity and the negative polarity, even when the generation timing of the timing signal is unexpectedly shifted.

In order to attain the object, in the method for driving the display device of the present invention, the fourth High level and the second High level have identical applied electric potentials; and the fourth Low level and the second Low level have identical applied electric potentials.

According to the configuration, when the driving signal has the electric potential level which varies between (i) the second period and (ii) the third and first periods among the sequential third, fourth, and first periods across two frames, the voltage, which is charged in the loads, can follow the driving signal waveform more faithfully. Therefore, the configuration of the display device can be simplified by setting the fourth High and Low levels to have respective applied electric potentials which are equal to those of the respective second High and Low levels.

In order to attain the object, in the method for driving the display device of the present invention, the fourth High level is higher in electric potential than the second High level; and the fourth Low level and the second Low level have identical applied electric potentials.

With the configuration, an average potential of an on-load output waveform of the driving signal can be set to equal to or close to the common electric potential of the driving signal, in a case where the average potential of the on-load output waveform is biased toward the negative polarity side with respect to the common electric potential. Accordingly, the effective voltage applied to liquid crystal with the positive polarity can be set to be equal to that with the negative polarity. It is therefore possible to prevent the horizontal stripes in the displayed screen.

In order to attain the object, in the method for driving the display device of the present invention, the fourth High level and the second High level have identical applied electric potentials; and the fourth Low level is lower in electric potential than the second Low level.

With the configuration, an average potential of an on-load output waveform of the driving signal can be set to equal to or close to the common electric potential of the driving signal, in a case where the average potential of the on-load output waveform is biased toward the positive polarity side with respect to the common electric potential. Accordingly, the effective voltage applied to liquid crystal with the positive polarity can be set to be equal to that with the negative polarity. It is therefore possible to prevent the horizontal stripes in the displayed screen.

In order to attain the object, in the method for driving the display device of the present invention, the fourth High level is higher in electric potential than the second High level; and the fourth Low level is higher in electric potential than the second Low level.

With the configuration, an average potential of an on-load output waveform of the driving signal can be set to equal to or close to the common electric potential of the driving signal, even in a case where the charging rate of the loads is largely decreased on the positive polarity level side of the driving signal due to asymmetric distortion in which the average potential of the on-load output waveform is biased toward the negative polarity side with respect to the common electric potential. Accordingly, the effective voltage applied to liquid crystal with the positive polarity can be set to be equal to that with the negative polarity. That is, such a decrease in charging rate can be appropriately compensated. It is therefore possible to prevent the horizontal stripes in the displayed screen.

In order to attain the object, in the method for driving the display device of the present invention, the fourth High level is lower in electric potential than the second High level; and the fourth Low level is lower in electric potential than the second Low level.

With the configuration, an average potential of an on-load output waveform of the driving signal can be set to equal to or close to the common electric potential of the driving signal, even in a case where the charging rate of the loads is largely decreased on the negative polarity level side of the driving signal due to asymmetric distortion in which the average potential of the on-load output waveform is biased toward the positive polarity side with respect to the common electric potential. Accordingly, the effective voltage applied to liquid crystal with the positive polarity can be set to be equal to that with the negative polarity. That is, such a decrease in charging rate can be appropriately compensated. It is therefore possible to prevent the horizontal stripes in the displayed screen.

In order to attain the object, in the method for driving the display device of the present invention, each of the first period and the third period is shorter than a time length of each of the second High level and the second Low level.

According to the configuration, each of the first period and the third period is set to be shorter than a time length of each of the second High level and the second Low level. It is therefore possible to easily assign the periods other than the second period in one (1) frame period to non-display periods in the effective display area. This makes it possible to prevent a visible display from being adversely affected by the irregular switching of the electric potential levels of the driving signal in the first, third, and fourth periods.

In order to attain the object, in the method for driving the display device of the present invention, a time length of each of the fourth High level and the fourth Low level is shorter than each of the first period and the third period.

According to the configuration, a time length of each of the fourth High level and the fourth Low level is shorter than each of the first period and the third period. It is therefore possible to easily assign the periods other than the second period in one (1) frame period to non-display periods in the effective display area. This makes it possible to prevent a visible display from being adversely affected by the irregular switching of the electric potential levels of the driving signal in the first, third, and fourth periods.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention is suitably applicable to a device such as a liquid crystal television device.

REFERENCE SIGNS LIST

1: Liquid crystal display device (display device)
P: Picture element
CsL: Storage capacitor line
CS: Driving signal
GSP: Gate start pulse (timing signal)
F1: First frame
F2: Second frame
T1: Period (first period)
T2: Period (second period)
T3: Period (third period)
T4: Period (fourth period)
tH: High period (High level period)
tL: Low period (Low level period)
H: Applied electric potential (High level)
L: Applied electric potential (Low level)
HH: Applied electric potential (High level)
LL: Applied electric potential (Low level)
Hl: Applied electric potential (High level)
Lh: Applied electric potential (Low level)

The invention claimed is:

1. A display device in which a storage capacitor line is driven with a driving signal, wherein:
   the driving signal, which is generated in said display device, has an electric potential waveform in which each one (I) frame period is made up of a first period, a second period, a third period, and a fourth period, which are sequential periods in this order and have respective lengths, an electric potential level(s) of the driving signal being set in each of the first, second, third, and fourth periods;
   the first period starts based on a generation timing of a timing signal which determines a start timing of the one (I) frame period, the driving signal having any one of a first High level and a first Low level during the first period, and the first High level and the first Low level being alternated every frame period;
   in the second period, the electric potential level alternates between a second High level and a second Low level;
   during the third period, (i) the driving signal has a third High level when the driving signal has the first High level during the first period of the same frame or (ii) the driving signal has a third Low level when the driving signal has the first Low level during the first period of the same frame;
   in the fourth period, the electric potential level alternates between a fourth High level and a fourth Low level until a generation timing of the timing signal which determines a start timing of a following one (I) frame period;
   any adjacent two of the frame periods belong to a first frame and a second frame, respectively;
   in the first frame, the driving signal has (i) the first Low level during the first period, (ii) the second High level at the beginning and the end of the second period, and (iii) the third Low level during the third period, each of the first Low level and the third Low level being lower in electric potential than the second Low level; and
   in the second frame, the driving signal has (i) the first High level during the first period, (ii) the second Low level at the beginning and the end of the second period, and (iii) the third High level during the third period, each of the first High level and the third High level being higher in electric potential than the second High level.

2. The display device as set forth in claim 1, wherein:
the fourth High level and the second High level have identical applied electric potentials; and
   the fourth Low level and the second Low level have identical applied electric potentials.

3. The display device as set forth in claim 1, wherein:
   the fourth High level is higher in electric potential than the second High level; and the fourth Low level and the second Low level have identical applied electric potentials.

4. The display device as set forth in claim 1, wherein:
the fourth High level and the second High level have identical applied electric potentials; and
the fourth Low level is lower in electric potential than the second Low level.

5. The display device as set forth in claim 1, wherein:
the fourth High level is higher in electric potential than the second High level; and
the fourth Low level is higher in electric potential than the second Low level.

6. The display device as set forth in claim 1, wherein:
the fourth High level is lower in electric potential than the second High level; and
the fourth Low level is lower in electric potential than the second Low level.

7. The display device as set forth in claim 1, wherein:
each of the first period and the third period is shorter than a time length of each of the second High level and the second Low level.

8. The display device as set forth in claim 1, wherein:
a time length of each of the fourth High level and the fourth Low level is shorter than each of the first period and the third period.

9. A method for driving a display device in which a storage capacitor line is driven with a driving signal, said method comprising the step of:
generating the driving signal, wherein
the driving signal has an electric potential waveform in which each one (1) frame period is made up of a first period, a second period, a third period, and a fourth period, which are sequential periods in this order and have respective lengths, an electric potential level(s) of the driving signal being set in each of the first, second, third, and fourth periods,
the first period starts based on a generation timing of a timing signal which determines a start timing of the one (I) frame period, the driving signal having any one of a first High level and a first Low level during the first period, and the first High level and the first Low level being alternated every frame period,
in the second period, the electric potential level alternates between a second High level and a second Low level,
during the third period, (i) the driving signal has a third High level when the driving signal has the first High level during the first period of the same frame or (ii) the driving signal has a third Low level when the driving signal has the first Low level during the first period of the same frame,
in the fourth period, the electric potential level alternates between a fourth High level and a fourth Low level until a generation timing of the timing signal which determines a start timing of a following one (I) frame period,
any adjacent two of the frame periods belong to a first frame and a second frame, respectively,
in the first frame, the driving signal has (i) the first Low level during the first period, (ii) the second High level at the beginning and the end of the second period, and (iii) the third Low level during the third period, each of the first Low level and the third Low level being lower in electric potential than the second Low level, and
in the second frame, the driving signal has (i) the first High level during the first period, (ii) the second Low level at the beginning and the end of the second period, and (iii) the third High level during the third period, each of the first High level and the third High level being higher in electric potential than the second High level.

10. The method as set forth in claim 9, wherein:
the fourth High level and the second High level have identical applied electric potentials; and
the fourth Low level and the second Low level have identical applied electric potentials.

11. The method as set forth in claim 9, wherein:
the fourth High level is higher in electric potential than the second High level; and
the fourth Low level and the second Low level have identical applied electric potentials.

12. The method as set forth in claim 9, wherein:
the fourth High level and the second High level have identical applied electric potentials; and
the fourth Low level is lower in electric potential than the second Low level.

13. The method as set forth in claim 9, wherein:
the fourth High level is higher in electric potential than the second High level; and
the fourth Low level is higher in electric potential than the second Low level.

14. The method as set forth in claim 9, wherein:
the fourth High level is lower in electric potential than the second High level; and
the fourth Low level is lower in electric potential than the second Low level.

15. The method as set forth in claim 9, wherein:
each of the first period and the third period is shorter than a time length of each of the second High level and the second Low level.

16. The method as set forth in claim 9, wherein:
a time length of each of the fourth High level and the fourth Low level is shorter than each of the first period and the third period.

* * * * *